US008351110B2

(12) United States Patent
Watanabe (10) Patent No.: US 8,351,110 B2
(45) Date of Patent: Jan. 8, 2013

(54) OPTICAL-SIGNAL PROCESSING APPARATUS

(75) Inventor: Shigeki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 282 days.

(21) Appl. No.: 12/659,182

(22) Filed: Feb. 26, 2010

(65) Prior Publication Data

US 2010/0157417 A1 Jun. 24, 2010

Related U.S. Application Data

(63) Continuation of application No. PCT/JP2007/067069, filed on Aug. 31, 2007.

(51) Int. Cl.
*H04B 10/17* (2006.01)
*G02F 1/365* (2006.01)
*H04B 10/12* (2006.01)

(52) U.S. Cl. .................... 359/334; 359/330; 359/341.3; 359/341.33

(58) Field of Classification Search .................. 359/330, 359/341.3, 341.33, 334
See application file for complete search history.

(56) References Cited

U.S. PATENT DOCUMENTS

| 6,626,592 | B2* | 9/2003 | Watanabe | 398/150 |
| 7,155,095 | B2* | 12/2006 | Aso et al. | 385/123 |
| 2002/0114040 | A1* | 8/2002 | Watanabe | 359/161 |
| 2004/0042060 | A1* | 3/2004 | McKinstrie et al. | 359/330 |
| 2004/0190121 | A1* | 9/2004 | Popov et al. | 359/337 |
| 2006/0051100 | A1 | 3/2006 | Watanabe | |
| 2006/0204170 | A1* | 9/2006 | Igarashi et al. | 385/24 |
| 2006/0285197 | A1* | 12/2006 | McKinstrie | 359/333 |
| 2006/0291867 | A1 | 12/2006 | Tamura et al. | |
| 2007/0139762 | A1* | 6/2007 | Mckinstrie | 359/332 |
| 2007/0230518 | A1* | 10/2007 | Watanabe | 372/22 |
| 2009/0290882 | A1* | 11/2009 | Watanabe | 398/152 |
| 2010/0021105 | A1* | 1/2010 | Watanabe | 385/11 |

FOREIGN PATENT DOCUMENTS

| JP | 2005-235928 | 9/2005 |
| JP | 2006-184851 | 7/2006 |
| JP | 2007-3718 | 1/2007 |

OTHER PUBLICATIONS

"Noise in Orthogonally Pumped Fiber-Optical Parametric Amplifiers," P. Kylemark et al., IEEE Photonics Technology Letters, Jan. 15, 2007, vol. 19, No. 2, pp. 88-90.
"Polarization Independent Wavelength Conversion Using Fiber Four-Wave Mixing with Two Orthogonal Pump Lights of Different Frequencies," K. Inoue, Journal of Lightwave Technology, Nov. 1994, vol. 12, No. 11, pp. 1916-1920.
International Search Report for PCT/JP2007/067069, mailed on Nov. 27, 2007.

* cited by examiner

*Primary Examiner* — Eric Bolda
(74) *Attorney, Agent, or Firm* — Staas & Halsey LLP (57) ABSTRACT

An optical-signal processing apparatus includes a polarizer that is provided at an output terminal of an optical fiber, and polarization control units that adjust a first excitation light and a second excitation light input to the optical fiber. The polarization control units adjust polarization states of the first excitation light and the second excitation light so that, when the first excitation light and the second excitation light are input to the polarizer, polarization directions of the first excitation light and the second excitation light are orthogonal to each other, and angular difference between the polarization direction of the first excitation light and the polarization direction of the second excitation light, measured against the polarization main axis of the polarizer, is equal to or smaller than a threshold value.

18 Claims, 9 Drawing Sheets

DETECTION RESULT

| DETECTION POSITION | FIRST POSITION |
|---|---|
| POWER | P |
| POLARIZATION DIRECTION OF FIRST EXCITATION LIGHT | +XX DEGREES |
| POLARIZATION DIRECTION OF SECOND EXCITATION LIGHT | −XX DEGREES |

FIG.13

POWER COMPARISION TABLE

| DETECTION POSITION | IDEAL POWER |
|---|---|
| FIRST POSITION | $P_{i1}$ |
| SECOND POSITION | $P_{i2}$ |
| THIRD POSITION | $P_{i3}$ |

FIG.14

OPTICAL-SIGNAL PROCESSING APPARATUS

CROSS-REFERENCE TO RELATED APPLICATION(S)

This application is a continuation of International Application No. PCT/JP2007/067069, filed on Aug. 31, 2007, the entire contents of which are incorporated herein by reference.

FIELD

The embodiments discussed herein are directed to an optical-signal processing apparatus for amplifying an optical signal by inputting optical signals and excitation light to a nonlinear optical medium.

BACKGROUND

With a conventional or current optical transmission system, transmission speed (bit rate of data) and total transmission capacity (transmission speed per one channel×the number of channels) and the maximum distance the transmission can reach are dependent on the optical signal-to-noise ratio (optical S/N), waveform distortion, and phase distortion of the optical signal.

The waveform distortion and the phase distortion of an optical signal are highly dependent on chromatic dispersion (including high-order dispersion) and nonlinear optical effects and the like of transmission-path optical fibers. The optical S/N is dependent on amplified spontaneous emission noise (hereinafter, "ASE noise"), caused by an optical amplifiers for substituting loss in optical fibers, and noise characteristics and the like within a transmitting and receiving unit.

As for the transmission waveform distortion due to the chromatic dispersion, there has been developed both a transmission path in which normal dispersion fibers and anomalous dispersion fibers are provided alternately, and a compensation technology that uses a wavelength-dispersion compensating unit such as dispersion-compensating fibers or electric signal processing on the reception side, and the like.

Furthermore, there has been developed a practical system where the attenuation of power of an optical signal due to the loss in transmission-path fibers is compensated by optical amplifiers such as optical fibers and amplifiers, the system thereby allowing signals to be transmitted across oceans as a single-wavelength transmission or multiple-wavelength transmission at 10 Gb/s.

Japanese Laid-open Patent Publication No. 2006-184851 discloses a technology with which a control pulse of a different wavelength from that of the optical signal is generated, the generated control pulse and the optical signal are input to nonlinear optical fibers, and then the optical signal is parametrically amplified along the polarization direction of the control pulse, so that high-speed switching with high-switching efficiency over a sufficiently wide range of wavelengths can be realized.

The current problem to be solved is how to realize long-distance transmission with optical signals at high speed, e.g., at 40 Gb/s or 160 Gb/s. However, even with highly accurate dispersion compensation and qualified optical amplifiers being used conventionally, waveform distortion that remains and the decrease of optical S/N ratio caused by the ASE noise due to the addition by the optical amplifier are significant so that the practical distance of transmission is limited.

The significant problem is to shape the distorted waveform, correct the phase distortion, and suppress the accumulated ASE noise, so as to realize long-distance optical-fiber transmission with high-speed optical signals (including optical signals with wavelength-division multiplexing).

SUMMARY

According to an aspect of an embodiment of the invention, an optical-signal processing apparatus is for amplifying an optical signal by inputting the optical signal and excitation light into a nonlinear optical medium. The optical-signal processing apparatus includes a polarizer that is provided at an output terminal of the nonlinear optical medium; and an excitation light adjuster that adjusts polarization states of first excitation light and second excitation light that are input into the nonlinear optical medium. The excitation light adjuster adjusts the polarization states of the first excitation light and the second excitation light so that, when the first excitation light and the second excitation light are input to the polarizer, polarization directions of the first excitation light and the second excitation light are orthogonal to each other, and a difference in angle between the polarization direction of the first excitation light and the polarization direction of the second excitation light, with respect to the polarization main axis of the polarizer, is equal to or smaller than a threshold value.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENT

A preferred embodiment of the present invention will be explained with reference to accompanying drawings. The invention is not limited to the embodiments.

[a] First Embodiment

An outline and features of an optical-signal processing apparatus in accordance with a first embodiment are described first. The optical-signal processing apparatus in accordance with the first embodiment inputs optical signals and excitation light into a nonlinear optical medium (e.g., optical fibers) and amplifies the optical signals. The optical-signal processing apparatus includes a polarizer located at the output terminal of the nonlinear optical medium, and an excitation-light adjusting unit that adjusts the first excitation light and the second excitation light, which are input to the nonlinear optical medium.

When the first excitation light and the second excitation light are input to the polarizer, the excitation-light adjusting unit adjusts the polarization states of the first and second excitation lights, so that the polarization directions of the first and second excitation lights are substantially orthogonal to each other, and the angular difference between the polarization direction of the first excitation light and the polarization direction of the second excitation light, measured against the polarization main axis of the polarizer, is smaller than or equal to a threshold value.

As described, the optical-signal processing apparatus in accordance with the first embodiment adjusts the polarization states of the first and second excitation lights, so that the polarization directions of the first and second excitation lights are substantially orthogonal to each other, and the angle of the polarization direction of the first excitation light measured against the polarization main axis of the polarizer is substantially the same as the angle of the polarization direction of the second one, and the optical signal is thus amplified. As a result, the distorted waveform is shaped, the phase distortion is corrected, and the accumulated ASE noise is suppressed. Therefore, long-distance optical-fiber transmission with high-speed optical signals (including optical signals with wavelength-division multiplexing (WDM; Wavelength Division Multiplexing)) can be realized.

Figure 1:
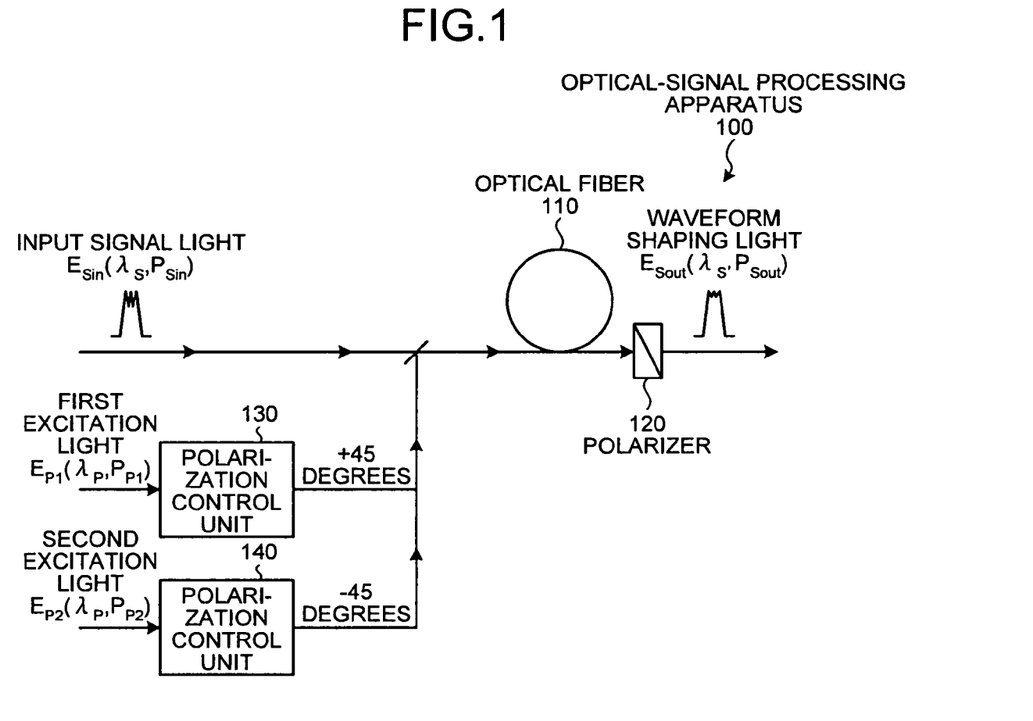
FIG. 1 illustrates a configuration of an optical-signal processing apparatus in accordance with a first embodiment.

The configuration of the optical-signal processing apparatus in accordance with the first embodiment is described. FIG. 1 illustrates the configuration of an optical-signal processing apparatus in accordance with the first embodiment. As illustrated in FIG. 1, an optical-signal processing apparatus 100 includes an optical fiber 110, a polarizer 120, and polarization control units 130 and 140.

The optical fiber 110 is a nonlinear optical medium that amplifies the power of incident signal light $E_{Sin}$ in the polarization direction of the first and second excitation lights with optical parametric effects due to four-wave mixing (FWM; Four-Wave Mixing) or the like when a synthesized wave of the incident signal light $E_{Sin}$ (wavelength: $\lambda_S$, power: $P_{Sin}$), the first excitation light $E_{P1}$ (wavelength: $\lambda_P$, power: $P_{P1}$), and the second excitation light $E_{P2}$ (wavelength: $\lambda_P$, power $P_{P2}$) is input to the optical fiber 110. The output light, output from the optical fiber 110, is input to the polarizer 120.

The polarizer 120 generates the waveform shaping light $E_{Sout}$ (wavelength: $\lambda_S$, power: $P_{Sout}$), which is obtained by extracting the light along the polarization main axis from the output light, when the output light from the optical fiber 110 is input to the polarizer 120.

The polarization control unit 130 adjusts the power and the polarization state of the first excitation light $E_{P1}$. Specifically, the polarization control unit 130 adjusts the polarization direction of the first excitation light $E_{P1}$ to approximately +45° with respect to the main axis of the polarizer 120 (e.g., +42° to +48°) (a straight polarized light with approximately +45° with respect to the main axis of the polarizer 120, when input to the polarizer 120).

The polarization control unit 140 adjusts the power and the polarization state of the second excitation light $E_{P2}$. Specifically, the polarization control unit 140 adjusts the polarization direction of the second excitation light $E_{P2}$ to approximately −45° with respect to the main axis of the polarizer 120 (e.g., −48° to −42°) (a straight polarized light with −45° with respect to the main axis of the polarizer 120, when input to the polarizer 120).

Figure 2:
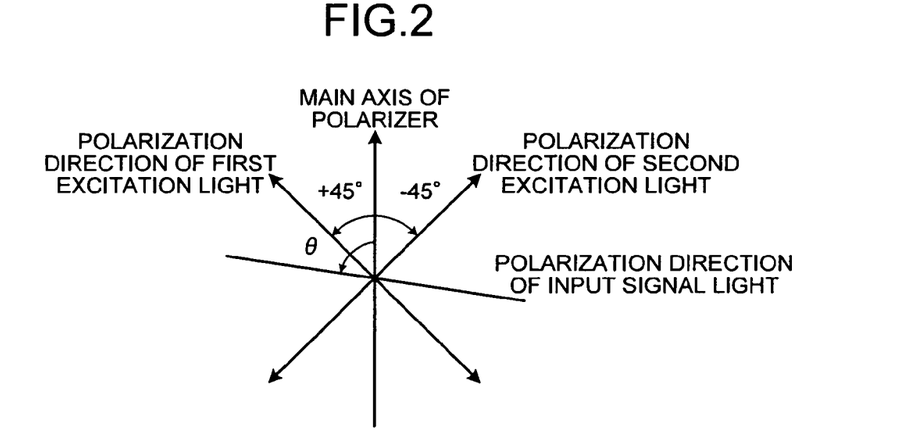
FIG. 2 illustrates relations among the main axis of a polarizer, and polarization directions of the first and second excitation lights.

FIG. 2 illustrates relations among the main axis of the polarizer 120, and the polarization directions of the first and second excitation lights. As illustrated in FIG. 2, the polarization direction of the first excitation light $E_{P1}$ makes an angle of +45° with respect to the main axis of the polarizer 120 while the polarization direction of the second excitation light $E_{P2}$ makes an angle of −45° with respect to the main axis of the polarizer 120. Thus, because of the polarization control units 130 and 140, the polarization directions of the first excitation light $E_{P1}$ and the second excitation light $E_{P2}$ are orthogonal to each other. The polarization direction of the incident signal light $E_{Sin}$, is polarized in an arbitrary direction $\theta$ when viewed along the main axis of the polarizer 120.

As the polarization control units 130 and 140 increase the power $P_{P1}$ and $P_{P2}$ of the first excitation light En and the second excitation light $E_{P2}$, the incident signal light $E_{Sin}$, is amplified in the polarization directions of the first excitation light $E_{P1}$ and the second excitation light $E_{P2}$ because of parametric amplification effects due to four-wave mixing of the optical fiber 110.

When $P_{Sin}$ represents the power of the incident signal light $E_{Sin}$, $G_1$ represents the power gain of the first excitation light $E_{P1}$, and $G_2$ represents the power gain of the second excitation light $E_{P2}$, $P_{Sout}$, i.e., the power of the waveform shaping light $E_{Sout}$ output from the polarizer 120, can be obtained by the following Equation (1).

$$P_{Sout} = \frac{1}{2}[G_1 \cos^2(\theta - 45°) + G_2 \cos^2(\theta + 45°)]P_{Sin} \quad (1)$$

In Equation (1), $\theta$ represents an angle between the main axis of the polarizer 120 and the polarization direction of the input signal light $E_{Sin}$.

Supposing that nonlinear effects in the optical fiber 110 are not dependent on the polarization states of the first and second excitation lights, then $G_1$ and $G_2$ are dependent on square of $P_{P1}$ and $P_{P2}$, respectively. Therefore, when the polarization control units 130 and 140 adjust the power $P_{P1}$ and $P_{P2}$ of each excitation light as $P_{P1}=P_{P2}=P_P$, the power gain of each excitation light is $G_1=G_2=G$. Equation (1) can be simplified into the following Equation (2).

$$P_{Sout} = \frac{1}{2}[G\cos^2(\theta - 45°) + G\cos^2(\theta + 45°)]P_{Sin} \quad (2)$$
$$= \frac{1}{2}GP_{Sin}$$

$P_{Sout}$ is not dependent on the polarization direction of the incident signal light $E_{Sin}$, and the power of the waveform shaping light $E_{Sout}$ can be output at a constant value.

When the power $P_{Sout}$ of the waveform shaping light $E_{Sout}$ is output at a constant value, the waveform shaping light is output as the straight polarization light along the main axis of the polarizer 120. Furthermore, if the optical parametric amplification gain G is higher than ½, the power of the incident signal light $E_{Sin}$ can be amplified. By adjusting the length and $P_P$ of the optical fiber 110, G can be obtained at a sufficiently high value (equal to or higher than ½).

For example, an administrator of the optical-signal processing apparatus 100 previously investigates relations among the optical parametric amplification gain G, the length of the optical fiber 110, and the power $P_P$ of the first and second excitation lights and sets the power $P_P$ on the polarization control units 130 and 140 in order to obtain the optical parametric amplification gain G equal to or higher than ½. Because the power of the first and second excitation lights is adjusted to the power $P_P$ that is set up as above, the polarization control units 130 and 140 can make the optical parametric amplification gain G equal to or higher than ½.

With the optical parametric amplification gain G saturated, the optical limiter amplifier that maintains the output power (the power $P_{Sout}$ of the waveform shaping light $E_{Sout}$) steady can be realized. This allows, for example, the waveform to be shaped in a way where the intensity noise can be suppressed. The response time of the optical parametric amplification within the optical fiber 110 is about several femtosecond order, and the waveform shaping of the extremely high-speed signal light, even above terabits, can be realized.

Figure 3A:
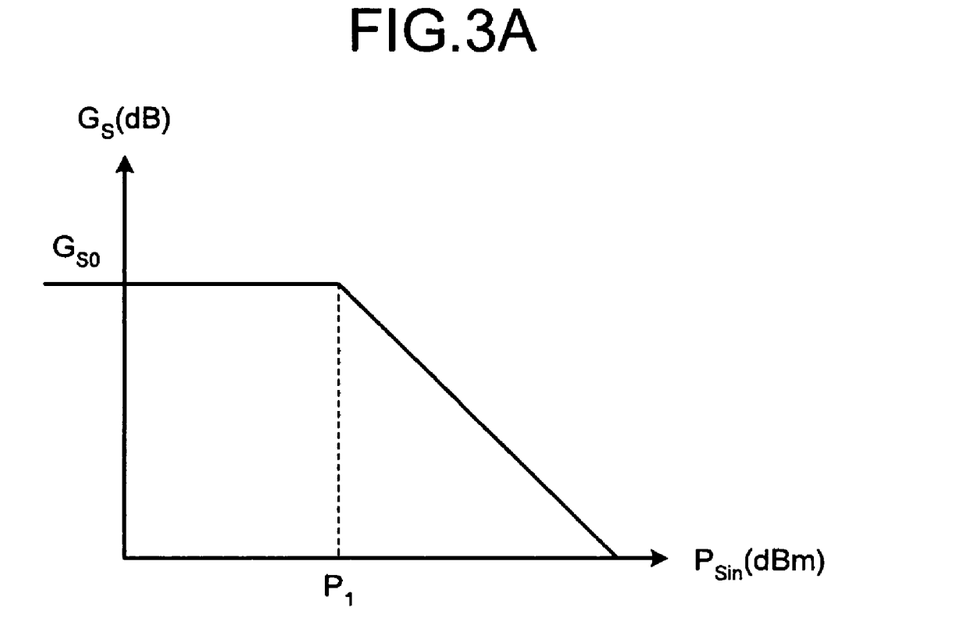
FIGS. 3A and 3B illustrate an example of effects of an optical limiter amplifier.
Figure 3B:
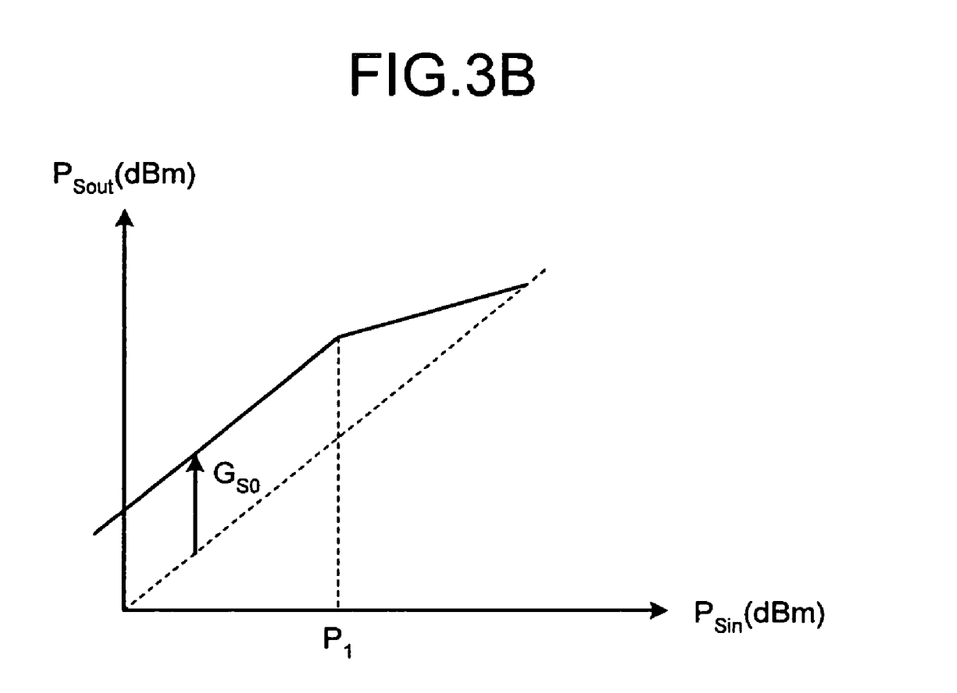

FIG. 3 illustrates an example of effects of the optical limiter amplifier. As illustrated in FIG. 3A, the gain of the optical limiter amplifier is linear ($=G_{S0}$) when the power $P_{Sin}$ of the incident signal light is low but is saturated when the power $P_{Sin}$ of the incident signal light is equal to or higher than the predetermined value ($P_1$ in FIG. 3). As a result, the fluctuations of the power ($P_{Sout}$) amplitude of the waveform shaping light can be suppressed. FIG. 3B illustrates relations between the power $P_{Sin}$ of the incident signal light and the power $P_{Sout}$ of the waveform shaping light.

Figure 4A:
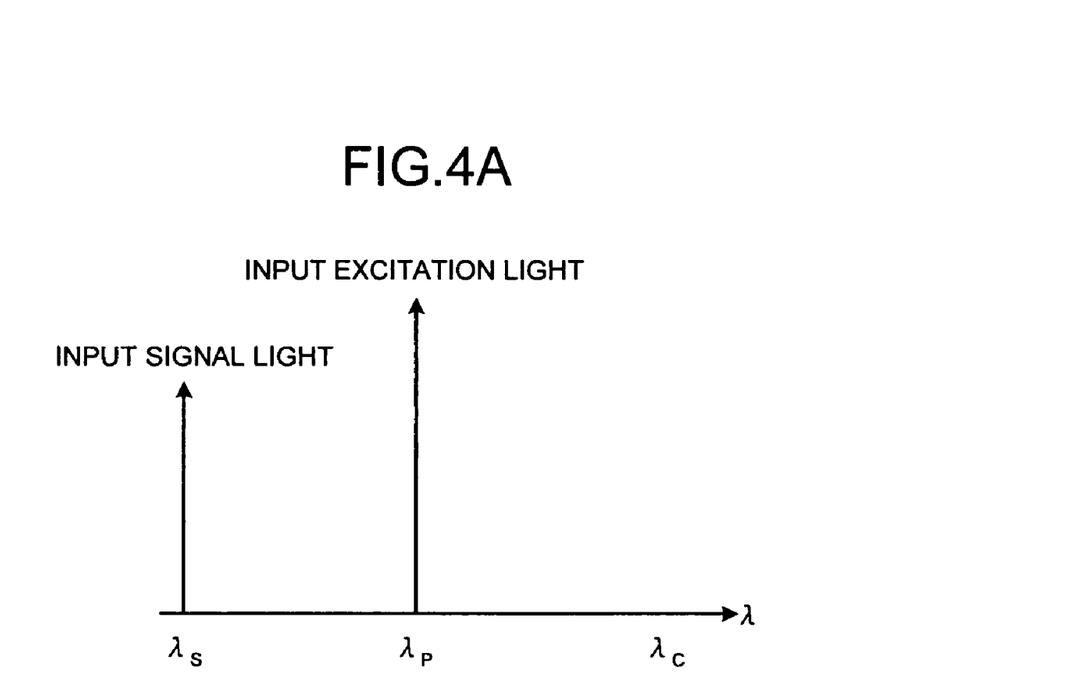
FIGS. 4A and 4B illustrate a wavelength position of the four-wave mixing (FWM)
Figure 4B:
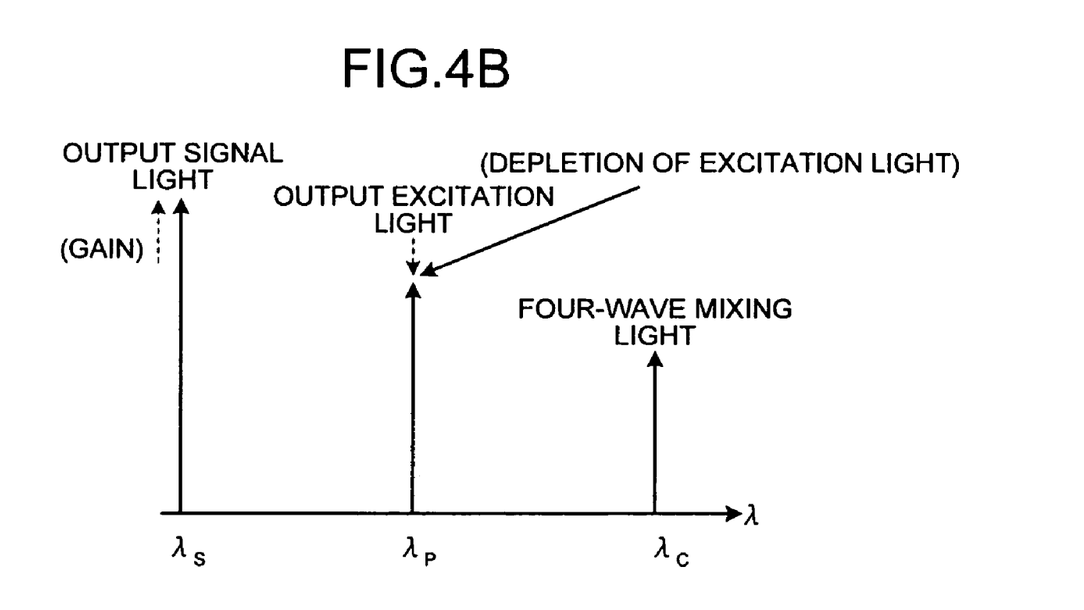

FIGS. 4A and 4B illustrate a wavelength allocation of the four-wave mixing (FWM). In FIGS. 4A and 4B, $\lambda_S$ represents the wavelength of the incident signal light $E_{Sin}$, $\lambda_P$ represents the wavelength of the first and second excitation lights. The incident signal light $E_{Sin}$ and the first and second excitation lights $E_{P1}$ and $E_{P1}$ are input to the optical fiber 110. The input power ($P_{Sin}$, $P_P$) of the incident signal light $E_{Sin}$ and the first and second excitation lights $E_{P1}$ and $E_{P1}$ to the optical fiber 110 are controlled using a power controller (not depicted) or the polarization control units 130 and 140.

The optical filter (polarizer 120) that is set on the output side of the optical fiber 110 is used as needed in order to eliminate optical signals output from the optical fiber 110. In the optical fiber 110, the incident signal light $E_{Sin}$ described above is amplified (optical parametric amplification) by the first excitation light $E_{P1}$ and the second excitation light $E_{P2}$.

The gain of the optical parametric amplification increases approximately in proportion to square of $P_P$ when the power $P_P$ of the excitation light is sufficiently higher (higher by the predetermined value or more; see the upper side in FIG. 4) than the power $P_{Sin}$ of the incident signal light. When $P_{Sin}$ is high and $P_P$ is determined as not being sufficiently higher than the $P_P$ (i.e., a difference between $P_P$ and $P_{Sin}$ is lower than the predetermined value), the power $P_P$ of the excitation light becomes high for generating four-wave mixing (FWM), and, as a result, the attenuation "Depletion" of $P_P$ occurs (see the lower side of FIG. 4).

When the Depletion of the excitation light occurs (the difference between $P_P$ and $P_{Sin}$ is set lower than the predetermined value by the power controller or the polarization control units 130 and 140), the gain of the optical parametric amplification becomes rapidly saturated. As a result, even when the input power $P_{Sin}$ of the incident signal light is increased, the power $P_{Sout}$ of the waveform shaping light output from the optical fiber 110 does not increase over a certain value, and the optical parametric amplifier functions as an optical limiter amplifier. When the power $P_{Sin}$ of the incident signal light fluctuates in the optical limiter amplifier with the optical limiter amplifier, the output power ($P_{Sout}$) is maintained steady so that the fluctuation in the amplitude is suppressed.

Figure 5:
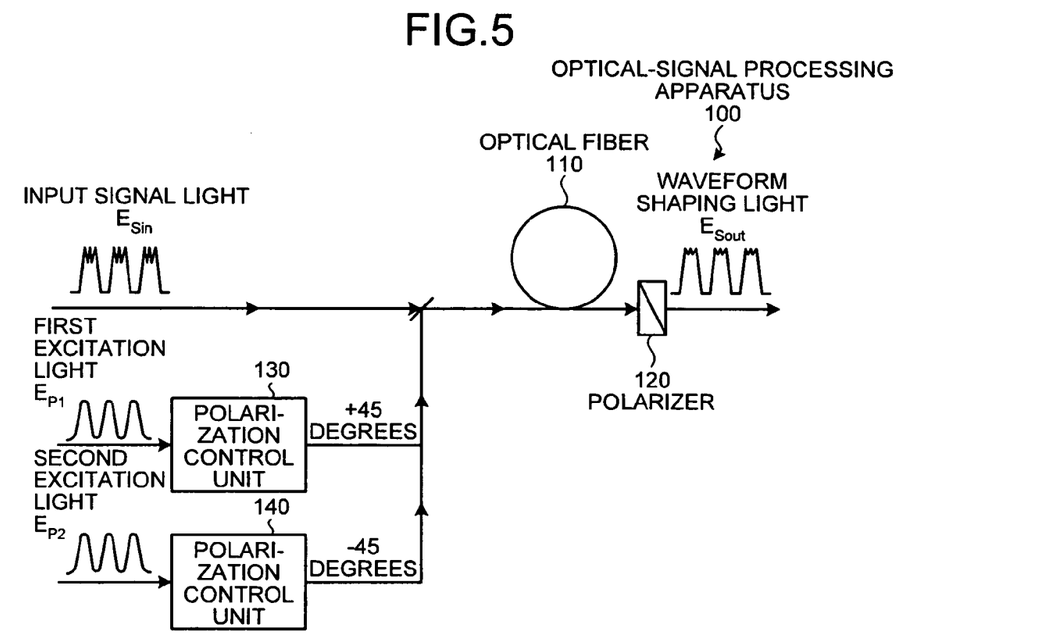
FIG. 5 illustrates a case where optical pulses of the same cyclic frequency as the incident signal light are used as the first and second excitation lights.

FIG. 5 illustrates a case where optical pulses of the same cyclic frequency as the incident signal light are used as the first and second excitation lights. In FIG. 5, the (predetermined) cyclic frequency of the first and second excitation lights $E_{P1}$ and $E_{P2}$ may be the same as the base frequency of the incident signal light $E_{Sin}$. The instances of the first and second excitation lights $E_{P1}$ and $E_{P2}$ may synchronize with the incident signal light $E_{Sin}$, or the instances of the first and second excitation lights $E_{P1}$ and $E_{P2}$ may be different to each other. The pulses illustrated in FIG. 5 are generated by a pulse generating apparatus (not depicted) and the like.

Figure 6:
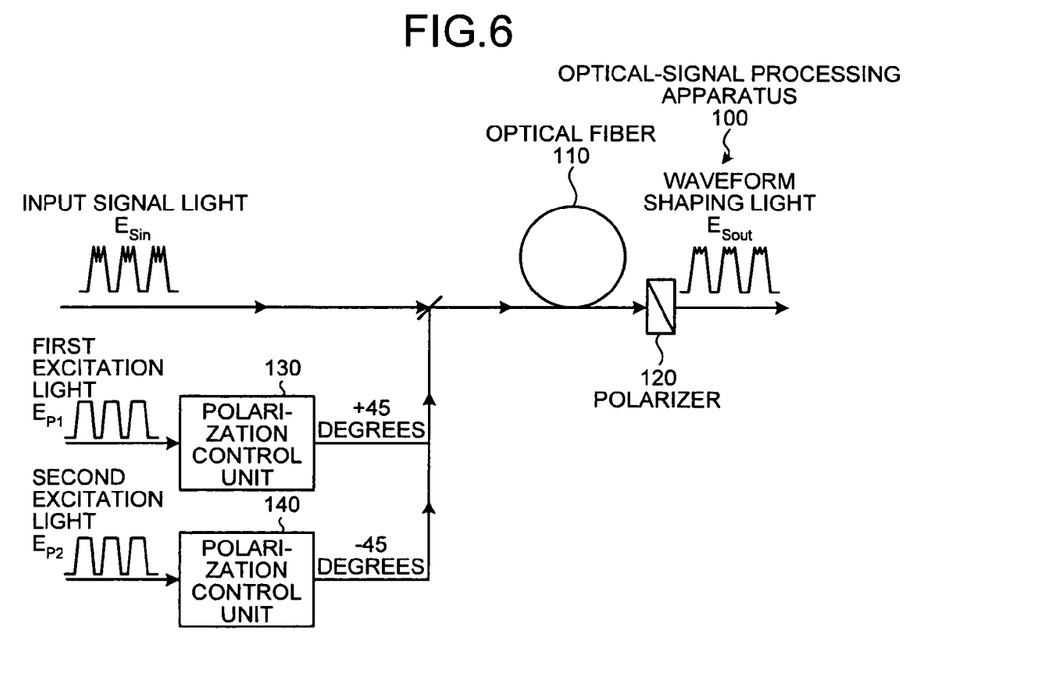
FIG. 6 illustrates a case where the peaks of the optical signal for the first and second excitation lights are flat.

FIG. 6 illustrates a case where the peaks of the optical signal for the first and second excitation lights are flat. This can prevent the unsteadiness caused by the fluctuation over time and suppress the effects of the nonlinear phase distortion caused by the excitation light, compared with a case where the peaks are narrow like the optical pulses illustrated in FIG. 5. The excitation light illustrated in FIG. 6 (the peaks of the optical signal are flat) is generated by the pulse generating apparatus (not depicted) and the like.

As described, the optical-signal processing apparatus 100 in accordance with the first embodiment includes the polarizer 120 that is positioned at the output terminal of the optical fiber, and the polarization control units 130 and 140 that adjust the first excitation light and the second excitation light that are input to the optical fiber 110. When the first excitation light and the second excitation light are input to the polarizer 120, the polarization control units 130 and 140 adjust the polarization states of the first and second excitation lights so that the polarization directions of the first and second excitation lights are orthogonal to each other, and the angular difference between the polarization direction of the first excitation light and the polarization direction of the second excitation light, measured with respect to the polarization main axis of the polarizer 120, is smaller or equal to a threshold value. Thus, the distorted waveform can be shaped, the phase distortion can be corrected, and the accumulated ASE noise can be suppressed. Therefore, the long-distance optical-fiber transmission with high-speed optical signals (including optical signals with wavelength-division multiplexing (WDM; Wavelength Division Multiplexing)) can be realized.

[b] Second Embodiment

In the present invention, CW (Continuous Wave) light or optical-pulse light can be used as the excitation light. When the optical signals are excited using the CW light, this process can be simple because the instance control to the optical signals is not always needed. However, the efficiency of generating nonlinear optical effects is dependent on the peak power of the excitation light. In order to maintain sufficient gain, a linear optical amplifier with high output power may be required, and the sufficiently high power of the excitation light input to the nonlinear optical medium may be reflected, which hinders the generation of four-wave mixing (FMW).

When the excitation is caused by the optical pulses, high peak power can be easily maintained, and therefore high gain can be expected. However, it is needed to synchronize the instances of the optical signal and the excitation light, and a clock regenerating circuit or the like may be needed.

Figure 7:
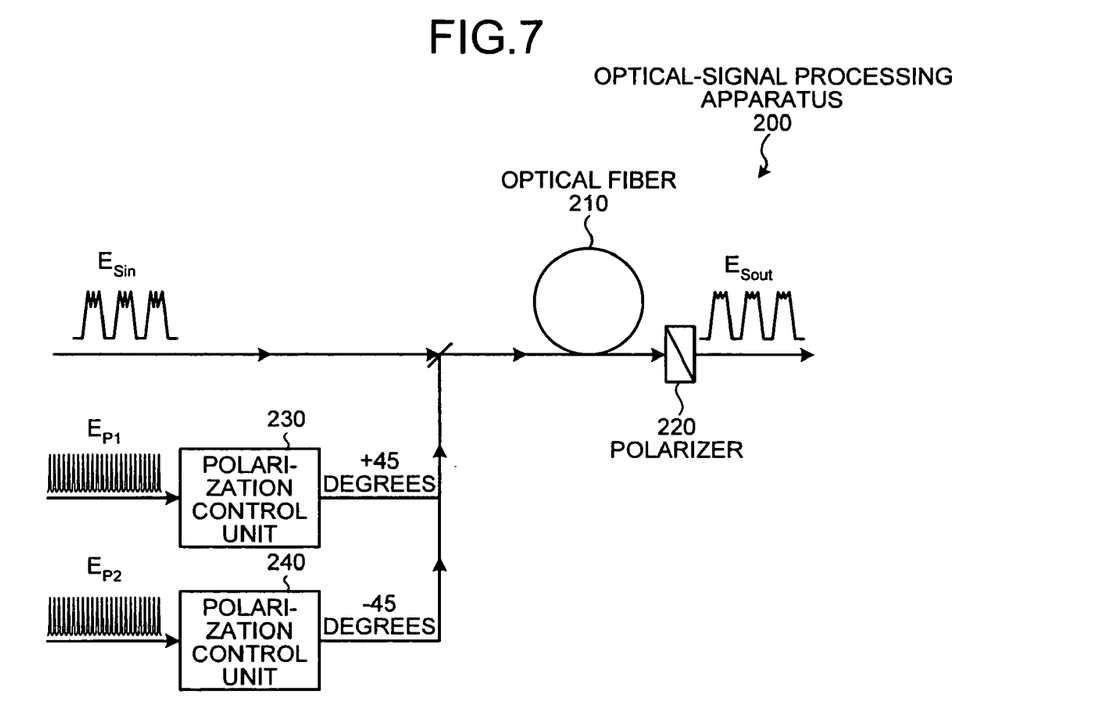
FIG. 7 illustrates a configuration of an optical-signal processing apparatus in accordance with a second embodiment.

In the optical-signal processing apparatus in accordance with a second embodiment, optical pulses of cyclic frequency higher than the base frequency of the optical signal are used as the excitation light. FIG. 7 illustrates a configuration of an optical-signal processing apparatus 200 in accordance with the second embodiment. As illustrated in FIG. 7, the optical-signal processing apparatus 200 includes an optical fiber 210, a polarizer 220, and polarization control units 230 and 240.

The optical fiber 210 and the polarizer 220 are the same as the optical fiber 110 and the polarizer 120 illustrated in FIG. 1, and descriptions of these are omitted.

The polarization control unit 230 adjusts the power and the polarization state of the first excitation light $E_{P1}$ (the first excitation light is optical pulses of the cyclic frequency higher than the base frequency of the incident signal light $E_{Sin}$). Specifically, the polarization control unit 230 adjusts the polarization direction of the first excitation light $E_{P1}$ to approximately +45° with respect to the main axis of the polarizer 220 (e.g., +42° to +48°) (a straight polarized light with approximately +45° with respect to the main axis of the polarizer 220, when input to the polarizer 220).

The polarization control unit 240 adjusts the power and the polarization state of the second excitation light $E_{P2}$ (the first excitation light is optical pulses of the cyclic frequency higher than the base frequency of the incident signal light $E_{Sin}$). Specifically, the polarization control unit 240 adjusts the polarization direction of the second excitation light $E_{P2}$ to approximately +45° with respect to the main axis of the polarizer 220 (e.g., +42° to +48°) (a straight polarized light with approximately +45° with respect to the main axis of the polarizer 220, is input to the polarizer 220).

The first and second excitation lights $E_{P1}$ and $E_{P2}$ input to the polarization control units 230 and 240 are generated by the excitation light generating unit (not depicted).

When the wavelength of the incident signal light $E_{Sin}$ is different from that of the excitation light, these lights are not synchronized due to the dispersion and fluctuation of the wavelength within the nonlinear optical medium. Because nonlinear optical effects are dependent on the peak power of the excitation light pulse, the present method (a method of using optical pulses of the cyclic frequency higher than the base frequency of the incident signal light $E_{Sin}$ as the excitation light) can provide gain that is steady over time on average to the incident signal light $E_{Sin}$.

With linear optical amplification and the like, the first and second excitation lights $E_{P1}$ and $E_{P2}$ can achieve sufficiently high power of peaks in each pulse and can provide high gain on average. In this case, the lower the duty ratio of the excitation light is, the higher the peak power and the gain become. Therefore, the excitation light generating unit multiplexes pulses of even narrower pulse width (pulse width narrower than that of the incident signal light $E_{Sin}$ by a predetermined value or more) than that of the incident signal light $E_{Sin}$ over time so as to generate the first and second excitation lights $E_{P1}$ and $E_{P2}$, compared with the incident signal light $E_{Sin}$.

Because four-wave mixing (FWM) can obtain gain that is proportional to approximately square of the excitation light power, higher average gain can be obtained compared with the excitation using the CW light. Furthermore, due to the chromatic dispersion within the optical fiber 210, the excitation light pulses (first and second excitation lights $E_{P1}$ and $E_{P2}$) are relatively shifted in terms of time. Therefore, the incident signal light $E_{Sin}$ can be amplified (optical parametric amplification) over time on average.

In this case, the intervals of each pulse of the first and second excitation lights $E_{P1}$ and $E_{P2}$ may be consistent or may be shifted in a manner such that these pulses are not overlapped. In the optical-signal processing apparatus 200, the constant optical parametric effect can be generated without the synchronization of the instances of the input signal light $E_{Sin}$ and the instances of the first and second excitation lights $E_{P1}$ and $E_{P2}$.

As described, the optical-signal processing apparatus 200 in accordance with the second embodiment includes the polarizer 220 that is positioned at the output terminal of the optical fiber 210, and the polarization control units 230 and 240 that adjust the first and second excitation lights input to the optical fiber 210. When the first and second excitation lights, of cyclic frequency higher than the base frequency of the optical signal, are input to the polarizer 220, the polarization control units 230 and 240 adjust the polarization states of the first and second excitation lights so that the polarization directions of the first and second excitation lights are orthogonal to each other, and the angular difference between the polarization direction of the first excitation light and the polarization direction of the second excitation lights, measured against the polarization main axis of the polarizer, is smaller than or equal to a threshold value. Without synchronizing the instance of the incident signal light with the instances of the first and second excitation lights, steady optical parametric effects can be generated, and high gain can be expected.

[c] Third Embodiment

The first embodiment describes a case where the optical limiter amplifier that maintains the output power steady by saturating the optical parametric gain of the optical-signal processing apparatus 100 (200). In a third embodiment, the incident signal light is input to such an optical limiter amplifier so that the waveform is shaped or the amplitude noise of the incident signal light is suppressed.

Figure 8:
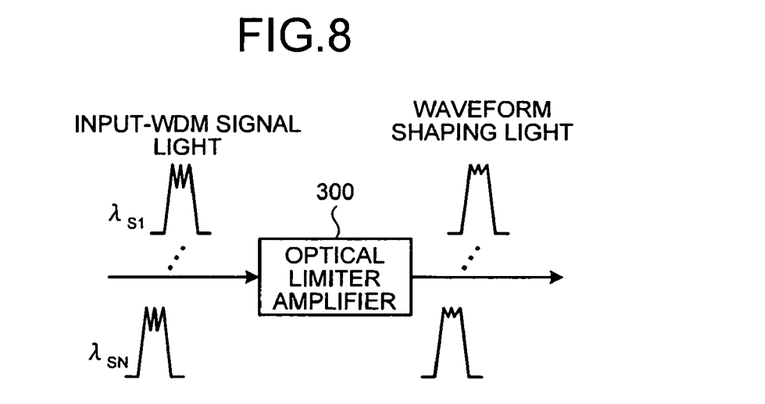
FIG. 8 illustrates an optical limiter amplifier in accordance with a third embodiment.

The third embodiment describes a case where the waveform is shaped by inputting the optical signal with wavelength-division multiplexing (WDM) (hereinafter, "input-WDM signal light") to the optical limiter amplifier. FIG. 8 illustrates an optical limiter amplifier in accordance with the third embodiment. The configuration of an optical limiter amplifier 300 illustrated in FIG. 8 is the same as that of the optical-signal processing apparatus 100, and therefore descriptions of the configuration are omitted.

As for the waveform shaping, a number of methods of executing optical signals of a single wavelength have been proposed and applied but none of them shapes the waveform of the input-WDM signal light all at once. The instances of each channel of the input-WDM signal light are random. The optical limiter amplifier 300 uses, as the excitation light, short optical pulses of the cyclic frequency that is sufficiently higher (higher than the modulation rate of the optical signals by the predetermined value or more) than the modulation rate of the optical signals of each channel. The short optical pulses are shifted mutually in terms of time so that the waveform of the signal light in each channel can be shaped on average.

An example method of causing excitation at random instances to each channel of the input-WDM signal light is to increase the chromatic dispersion of the optical fiber (optical fiber 110; see FIG. 1).

In order to main the generation efficiency of four-wave mixing (FWM) steady for all channels of input-WDM signal light, the wavelength of the excitation light needs to be set around the (average) zero-dispersion wavelength (within a predetermined range based on the zero-dispersion wavelength). In this case, a dispersion value of the wavelength of the signal light can be increased using a dispersion slope of the optical fiber 110.

A method of inserting a medium that significantly shifts instances into a part of the optical fiber 110 is also effective. For example, a method of using a shortened length of (to be equal to or shorter than the predetermined value) a dispersion-correction fiber a unit length of which causes great dispersion or dispersion-correction optical devices can be considered. Furthermore, an optical fiber that causes different chromatic dispersion depending on the first and second excitation lights or the incident signal light may be used.

With the optical fiber used in the third embodiment (or the first or second embodiment), the zero-dispersion wavelength may be the same or approximately the same as the wavelengths of the first and second excitation lights (the wavelengths of the first and second excitation lights are within a predetermined range based on the zero dispersion wavelength). According to this configuration, optical parametric amplification due to four-wave mixing (FWM) is highly effective.

Particularly, a high nonlinear fiber (HNLF) with high nonlinear optical effects is suitable for the optical fiber. In the core, germanium and bismuth or the like may be doped so as to increase the nonlinear refractive index. When it is designed with small mode field (smaller than the predetermined value), a type with the optical power intensity is high or a type with a photonic crystal fiber structure can be used.

Although it is the optical parametric amplification with the optical fiber that is described above, optical Raman amplification with the same configuration may be used. Furthermore, other nonlinear optical medium, e.g., a semi-conductor optical amplifier with a quantum-well structure or with a quantum-dot structure, may be used.

Other devices with the optical parametric amplification effect may be a periodically poled $LiNbO_3$ (PPLN) waveguide, a GaAlAs device, or a second-order nonlinear optical crystal.

Furthermore, because the amplification processes above do not influence the phase of the signal light, the method of arranging the waveform above can be applied to the signal light that is modulated by the optical intensity modulation, the optical phase modulation, and the optical frequency modulation. As for the optical-phase-modulation signal light, the optical limiter amplifier 300 does not suppress the phase noise itself but decreases the intensity fluctuation. Therefore, the optical-phase-modulation signal light is suitable for decreasing the phase noise caused by the intensity fluctuation.

In the optical fiber transmission, the intensity noise is converted into the phase noise (AM/PM conversion) due to the nonlinear optical effects within the optical fiber. This is one of the factors that determine the transmission limit of the optical-phase-modulation signal light. According to the present invention, the AM/PM converted noise can be suppressed and this suppression is effective.

Other methods of suppressing the zero-level fluctuation is to provide a saturable absorbing apparatus before or after the optical-signal processing apparatuses 100 and 200 (the optical limiter amplifier 300) in the first, second, and third embodiments. The saturable absorbing apparatus can be a semi-conductor saturable absorber, a semi-conductor amplifier, a Mach-Zehnder interferometer-type optical fiber switch, a nonlinear optical loop-mirror (NOLM) switch, and the like.

In the above description, the optical limiter amplifier 300 in accordance with the third embodiment saturates the optical parametric gain so that, even when the input-WDM signal light is input, the waveform of the optical signals included in each channel of the input-WDM signal light can be shaped all at once.

Figure 9:
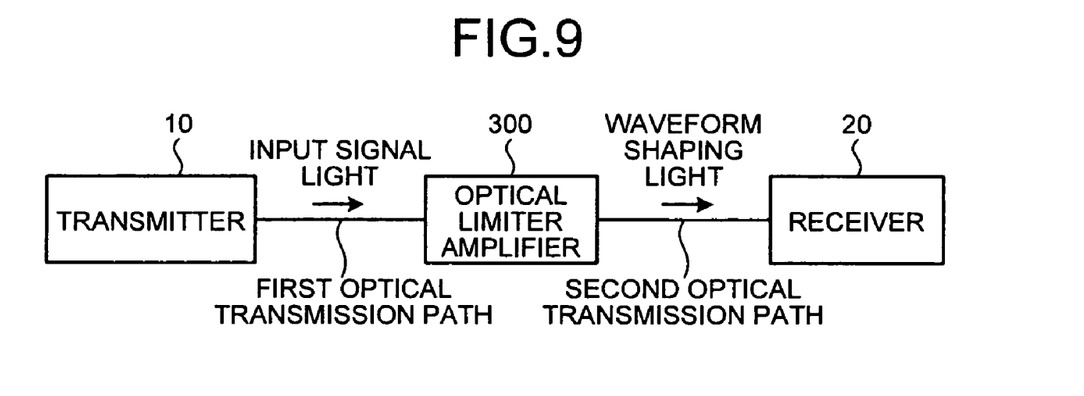
FIG. 9 illustrates an example case (1) where the optical limiter amplifier is applied to the optical transmission system.
Figure 10:
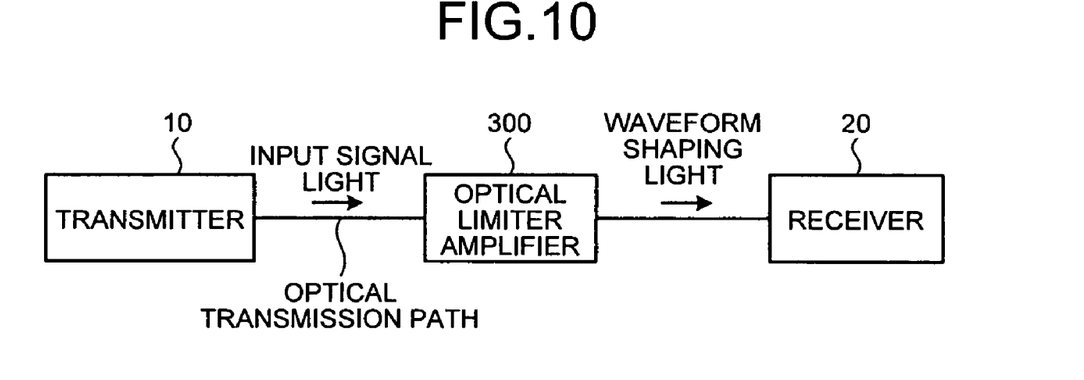
FIG. 10 illustrates an example case (2) where the optical limiter amplifier is applied to the optical transmission system.

The optical limiter amplifier 300 illustrated in the third embodiment can be applied to various kinds of the optical transmission system. FIGS. 9 and 10 illustrate example cases where the optical limiter amplifier 300 is applied to the optical transmission system.

In the example illustrated in FIG. 9, the optical limiter amplifier 300 is provided between the first and second transmission paths. With the optical limiter amplifier 300 provided, the waveform of the incident signal light is shaped by the optical limiter amplifier 300 after the incident signal light is transmitted through the first optical transmission path, and then the light whose waveform has been shaped is transmitted through the second optical transmission path to a receiver 20.

In the example illustrated in FIG. 10, the optical limiter amplifier 300 is provided on the reception terminal, and, after the waveform shaping, the receiver 20 receives optical signals. The transmission paths illustrated in FIGS. 9 and 10 can be any conventional system, e.g., a case where the optical signals are relayed through the optical amplifier so that the optical signals are amplified while the power is amplified, and a case where the chromatic dispersion in the transmission-path fiber is corrected with a system of the optimized design.

[d] Fourth Embodiment

The optical-signal processing apparatus in accordance with a fourth embodiment is described. The optical-signal processing apparatus in accordance with the fourth embodiment monitors the input light to the nonlinear optical medium, the output light from the nonlinear optical medium, or the output light from the polarizer and adjusts the power of the first and second excitation lights and the incident signal light provided previously to the nonlinear optical medium so that the optical signal processing can be optimized (i.e., the power $P_P$ of the incident signal light, and the first and second excitation lights is set equal to or higher than a predetermined value so that the optical parametric gain is saturated).

The optical-signal processing apparatus monitors the polarization states of the first and second excitation lights that are input to the polarizer and adjusts the first and second excitation lights so that the optical signal processing can be optimized (i.e., the polarization directions of the first and second excitation lights input to the polarizer make an approximately +45° (e.g., +42° to)+48° and approximately −45° (e.g., −48° to)-42° with respect to the main axis of the polarizer).

In the optical-signal processing apparatus in accordance with the fourth embodiment, in order to optimize the optical signal processing, the power and the polarization states of the incident signal light and the first and second excitation lights are adjusted so that the distorted waveform is shaped, the phase distortion is properly corrected, and the accumulated ASE noise is suppressed. Therefore, the long-distance optical-fiber transmission with high-speed optical signals can be realized.

Figure 11:
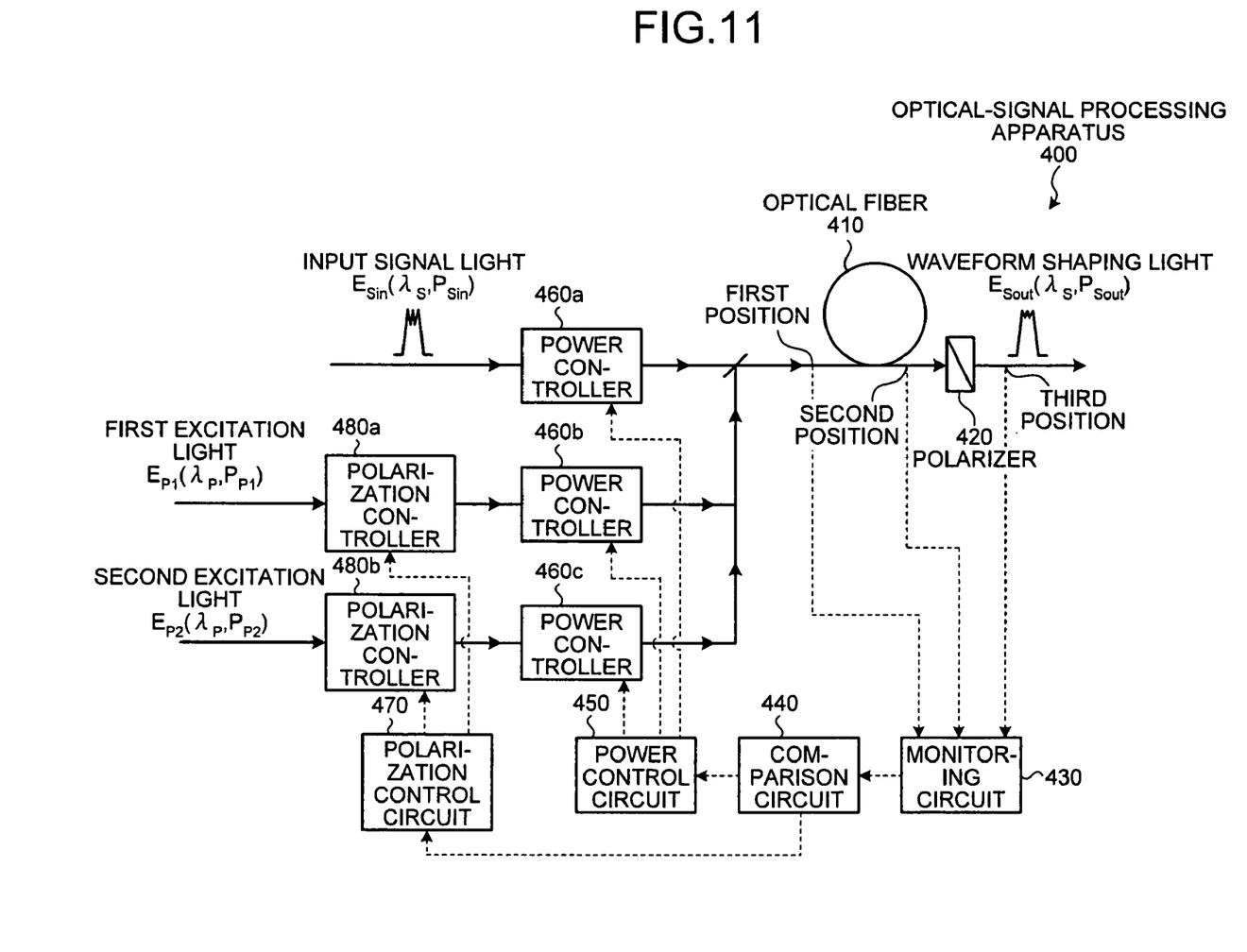
FIG. 11 is a functional block diagram illustrating a configuration of the optical-signal processing apparatus in accordance with a fourth embodiment.

The configuration of the optical-signal processing apparatus in accordance with the fourth embodiment is described. FIG. 11 is a functional block diagram illustrating the configuration of an optical-signal processing apparatus in accordance with the fourth embodiment. As illustrated in FIG. 11, an optical-signal processing apparatus 400 includes an optical fiber 410, a polarizer 420, a monitoring circuit 430, a comparison circuit 440, a power control circuit 450, power controllers 460a to 460c, a polarization control circuit 470, and polarization controllers 480a and 480b.

The optical fiber 410 and the polarizer 420 are the same as the optical fiber 110 and the polarizer 120 illustrated in FIG. 1, and therefore the descriptions of these components are omitted.

The monitoring circuit 430 is a processing unit that detects the power of the input light to the optical fiber 410, the output light from the optical fiber 410, and the output light from the polarizer 420, detects the polarization states of the first and second excitation lights input to the polarizer 420, and outputs the detection result to the comparison circuit 440.

As illustrated in FIG. 11, a position where the input light is about to enter the optical fiber 410 is defined as the first position, a position shortly after the output light is output from the optical fiber 410 is defined as the second position, and a position shortly after the output light is output from the polarizer 420 is defined as the third position.

Figure 12:
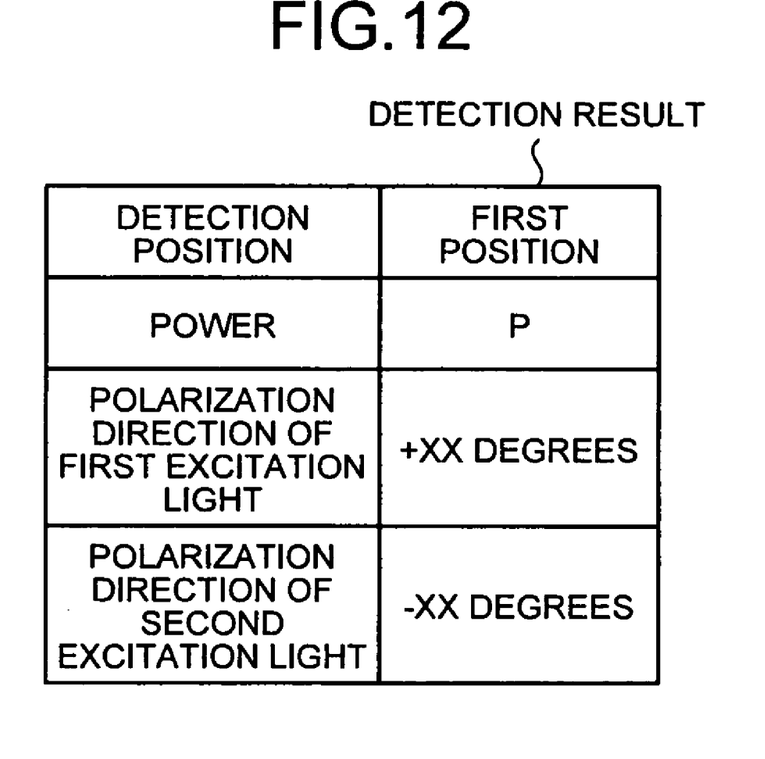
FIG. 12 illustrates an example of a data structure of a detection result that is output from a monitoring circuit to a comparison circuit.

FIG. 12 illustrates an example of a data structure of a detection result that is output from the monitoring circuit 430 to the comparison circuit 440. As illustrated in FIG. 12, the detection result includes data such as the detection position, the power of the optical signal, the polarization direction of the first excitation light $E_{P1}$ measured with respect to the main axis of the polarizer 420, and the polarization direction of the second excitation light $E_{P2}$ measured with respect to the main axis of the polarizer 420.

When the comparison circuit 440 obtains the detection result from the monitoring circuit 430, the comparison circuit 440 compares the detection result with the ideal power (which saturates the optical parametric gain) and the ideal polarization direction. The comparison unit then outputs the comparison result to the power control circuit 450 and the polarization control circuit 470.

Firstly, a case where the comparison circuit 440 compares the detection result with the ideal power is described. The comparison circuit 440 maintains a power comparison table. On the basis of the power comparison table and the search result, the comparison circuit 440 determines whether the power of the optical signal is higher or lower than the ideal power.

Figure 13:
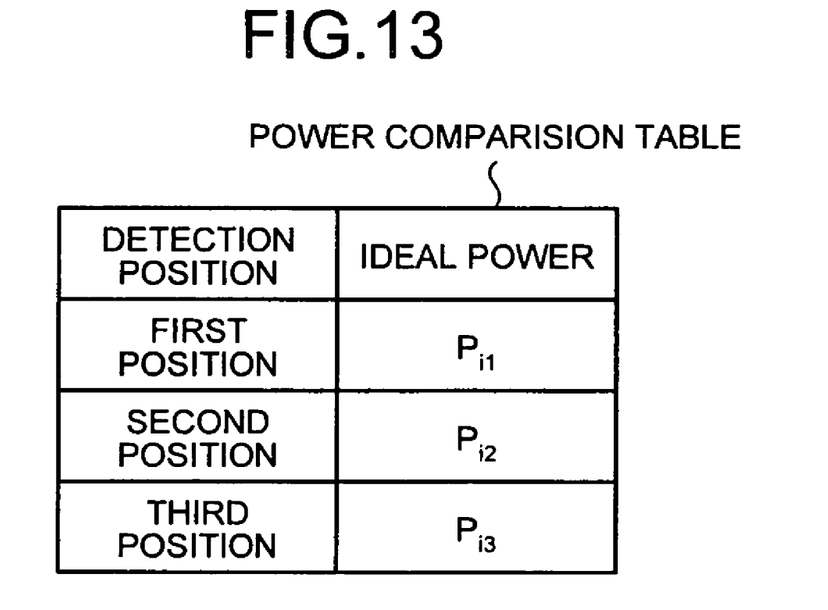
FIG. 13 illustrates an example of a data structure of a power comparison table.

FIG. 13 illustrates an example of a data structure of the power comparison table. As illustrated in FIG. 13, the power comparison table stores the detection position and the ideal power of the optical signal at the detection position. For example, the ideal power at the first position is $P_{i1}$, the ideal power at the second position is $P_{i2}$, and the ideal power at the third position is $P_{i3}$ (the ideal powers $P_{i1}$ to $P_{i3}$ are previously set by the administrator or someone else).

When the detection result is obtained, the comparison circuit 440 refers to the detection position included in the detection result, compares the power of the detection result with the ideal power corresponding to the detection position, and determines whether the power of the optical signal is higher or lower than the ideal power. The comparison circuit 440 outputs the determination result to a power control circuit 450.

A case where the comparison circuit 440 compares the polarization direction of the detection result with the ideal polarization direction is described. The ideal polarization direction is a polarization direction (i.e., the first ideal polarization direction) where the polarization direction of the first excitation light $E_{P1}$ input to the polarizer 420 makes an approximately +45° (e.g., +42° to +48°) with respect to the main axis of the polarizer and is a polarization direction (i.e., the second ideal polarization direction) where the polarization direction of the second excitation light $E_{P2}$ input to the polarizer 420 makes an approximately −45° (e.g., −42° to −48°) measured against the main axis of the polarizer.

The comparison circuit 440 compares the polarization direction of the first excitation light of the detection result with the first ideal polarization direction and outputs the comparison result to the polarization control circuit 470. Furthermore, the comparison circuit 440 compares the polarization direction of the second excitation light of the detection result with the second ideal polarization direction and outputs the comparison result to the polarization control circuit 470.

The power control circuit 450 is a processing unit that controls the power controllers 460a to 460c on the basis of the determination result of the comparison circuit 440. Specifically, when the determination result indicating that the power at the first, second, or third position is lower than the ideal power is obtained, the power control circuit 450 controls the power controllers 460a to 460c so as to increase the power of the incident signal light $E_{Sin}$, the first excitation light $E_{P1}$, or the second excitation light $E_{P2}$ by the predetermined value.

When the determination result indicating that the power at the first, second, or third position is equal to or higher than the ideal power is obtained, the power control circuit 450 controls the power controllers 460a to 460c so as to keep the power of the incident signal light $E_{Sin}$, the first excitation light $E_{P1}$, or the second excitation light $E_{P2}$ at the current value.

The power controller 460a responds to control instructions from the power control circuit 450 and adjusts the power of the incident signal light $E_{Sin}$. The power controller 460b responds to control instructions from the power control circuit 450 and adjusts the power of the first excitation light $E_{P1}$. The power controller 460c responds to control instructions from the power control circuit 450 and adjusts the power of the second excitation light $E_{P2}$.

The polarization control circuit 470 controls the polarization controllers 480a and 480b on the basis of the determination result of the comparison circuit 440. Specifically, when the angle made by the polarization direction of the first excitation light $E_{P1}$ is smaller than +45 degrees, the polarization control circuit 470 outputs to the polarization controller 480a a control instruction for rotating the polarization direction of the first excitation light $E_{P1}$ by the predetermined degrees in the positive direction. When the angle made by the polarization direction of the first excitation light $E_{P1}$ is larger than +45 degrees, the polarization control circuit 470 outputs to the polarization controller 480a a control instruction for rotating the polarization direction of the first excitation light $E_{P1}$ by the predetermined degrees in the negative direction.

When the angle made by the polarization direction of the second excitation light $E_{P2}$ is smaller than −45 degrees, the polarization control circuit 470 outputs to the polarization controller 480a a control instruction for rotating the polarization direction of the first excitation light $E_{P1}$ by the predetermined degrees in the positive direction. When the angle made by the polarization direction of the second excitation light $E_{P2}$ is larger than −45 degrees, the polarization control circuit 470 outputs to the polarization controller 480a a control instruction for rotating the polarization direction of the first excitation light $E_{P1}$ by the predetermined degrees in the negative direction.

The polarization controller 480a is a processing unit that responds to control instructions from the polarization control circuit 470 and adjusts the polarization direction of the first excitation light $E_{P1}$. The polarization controller 480b is a processing unit that responds to control instructions from the polarization control circuit 470 and adjusts the polarization direction of the second excitation light $E_{P2}$.

As described above, the optical-signal processing apparatus 400 in accordance with the fourth embodiment monitors the input light to the optical fiber 410, the output light from the optical fiber 410, and the output light from the polarizer 420 and adjusts the power of the first and second excitation lights and the incident signal light provided before the optical fiber 410 so that the optical signal processing is optimized (i.e., the power $P_P$ of the incident signal light, and the first and second excitation lights are set equal to or higher than the predetermined value so that the optical parametric gain is saturated). Furthermore, the optical-signal processing apparatus 400 monitors the polarization states of the first and second excitation lights input to the polarizer 420 and adjusts the first and second excitation lights so that the optical signal processing is optimized (i.e., the angles made by the polarization directions of the first and second excitation lights input to the polarizer are approximately +45 degrees (e.g., +42° to +48°) and approximately −45 degrees (e.g., −48° to −42°) with respect to the main axis of the polarizer). In the present embodiment, the distorted waveform can be shaped, the phase distortion can be further corrected, and the accumulated ASE noise can be suppressed. Therefore, the long-distance optical-fiber transmission with high-speed optical signals can be realized.

[e] Fifth Embodiment

An optical-signal processing apparatus in accordance with a fifth embodiment is described. In the optical-signal processing apparatus in accordance with the fifth embodiment, an optical filter that transmits the same bandwidth as the center wavelength of the optical signal bandwidth is provided at the output terminal of the polarizer or the optical fiber. When the bandwidth of the optical signal may expand due to the optical parametric gain amplification, the bandwidth of the output signal light is limited using the optical filter so that the excessive expansion of bandwidth is prevented.

When the signal light is on wavelength-division multiplexing (WDM) as illustrated in FIG. 8, the optical filter can be, effectively, an interleaver-type optical filter that transmits only the wavelength around the center wavelengths of each wave of the WDM signal light, or an optical filter that is a combination of the bandwidth removal filters blocking the band around the middle among the center wavelengths of each wavelength, or the like. With such a comb-like optical filter with a plurality of transmission bandwidths, the expansion of the bandwidth of the output WDM signal light and corresponding crosstalk can be suppressed.

Figure 14:
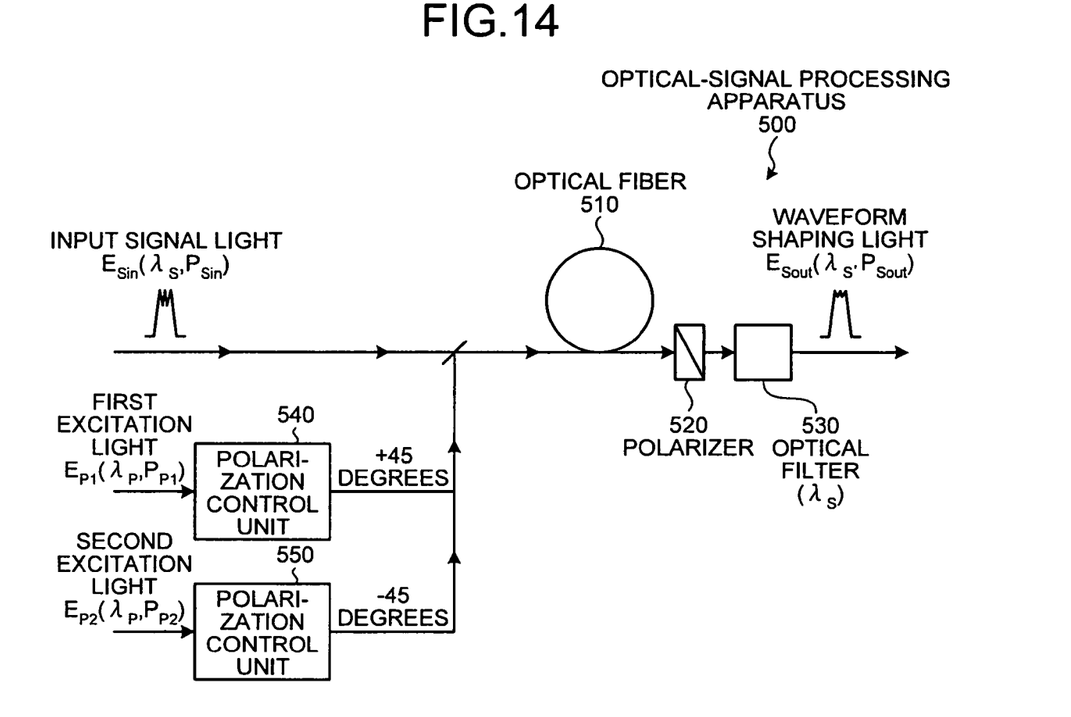
FIG. 14 illustrates a configuration of an optical-signal processing apparatus in accordance with a fifth embodiment.

FIG. 14 illustrates the configuration of an optical-signal processing apparatus 500. As illustrated in FIG. 14, the optical-signal processing apparatus 500 includes an optical fiber 510, a polarizer 520, an optical filter 530, polarization control units 540 and 550. Although the optical filter 530 is provided at the output terminal of the polarizer 520 in the example illustrated in FIG. 14, the optical filter 530 is provided between the optical fiber 510 and the polarizer 520.

The optical fiber 510, the polarizer 520, the polarization control units 540 and 550 are the same as the optical fiber 110, the polarizer 120, and the polarization control units 130 and 140 illustrated in FIG. 1. Therefore, the descriptions of these components are omitted.

The optical filter 530 transmits substantially the same bandwidth as the center wavelength of the optical signal output from the optical fiber 510 or the polarizer 520. For example, the center wavelength width of the incident signal light $E_{Sin}$ is $\lambda_S$, and the center transmission bandwidth of the optical filter 530 ranges from $\lambda_S+A$ to $\lambda_S-A$ (A is a predetermined value).

When the incident signal light $E_{Sin}$ processed by the optical-signal processing apparatus 500 is an optical signal with wavelength-division multiplexing, an interleaver-type optical filter that transmits only the wavelength around the center wavelengths of each wave of the incident signal light $E_{Sin}$, or an optical filter that is a combination of the bandwidth removal filters blocking the band around the middle among the center wavelengths of each wavelength may be used instead of the optical filter 530, so that the expansion of the bandwidth of the optical signal with wavelength-division multiplexing and corresponding crosstalk can be suppressed. For example, when the center wavelength bandwidths of each optical wave are $\lambda_I$, $\lambda_{I+1}$, $\lambda_{1+2}$, and so on, the center transmission bandwidths of the optical filter ranges from $\lambda_I-A$ to $\lambda_I+A$, from $\lambda_{I+1}-A$ to $\lambda_{I+1}+A$, from $\lambda_{1+2}-A$ to $\lambda_{1+2}+A$, and so on (A is a predetermined value).

As described above, in the optical-signal processing apparatus 500 in accordance with the fifth embodiment, the optical filter 530 that transmits the same bandwidth as the center wavelength of the optical signal is provided at the output terminal of the polarizer 520 or the optical fiber 510. Therefore, when the optical signal may expand due to the optical parametric gain, the excessive expansion of the bandwidth of the optical signal can be prevented.

In the processes described in the first to fifth embodiments, all or some processes described as automatically performed may be performed manually, and all or some processes described as being manually performed may be performed automatically with known methods. Furthermore, procedures, control procedures, specific names, information including various kinds of data and parameters that are illustrated in the above descriptions or in the figures may be arbitrarily modified except as otherwise provided.

Furthermore, the components of the optical-signal processing apparatuses 100 to 500 illustrated in the first to fifth embodiments are merely functional concepts, and the physical configurations of these components are not necessarily the same as those illustrated. Depending on various kinds of load and operation statuses, all or some of the apparatuses may be functionally or physically integrated/disintegrated into an arbitrary unit. Furthermore, all or some of the processing functions in the apparatuses may be realized with a CPU and programs that are analyzed and executed by the CPU or with hardware based on wired logic.

According to an embodiment of the present invention, a polarizer is provided at an output terminal of the nonlinear optical medium, an excitation light adjusting unit that adjusts polarization states of first excitation light and second excitation light that are input into the nonlinear optical medium. The excitation light adjusting unit adjusts the polarization states of the first excitation light and the second excitation light so that, when the first excitation light and the second excitation light are input to the polarizer, polarization directions of the first excitation light and the second excitation light are orthogonal to each other, and angular difference between the polarization direction of the first excitation light and the polarization direction of the second excitation light, measured against the polarization main axis of the polarizer, is equal to or smaller than a threshold value. Therefore, the distorted waveform can be shaped, the phase distortion can be corrected, and the accumulated ASE noise can be suppressed, so that long-distance optical-fiber transmission with high-speed optical signals (including optical signals with wavelength-division multiplexing) can be realized.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical-signal processing apparatus for amplifying an optical signal by inputting the optical signal and excitation light into a nonlinear optical medium, the optical-signal processing apparatus comprising:
a polarizer that is provided at an output terminal of the nonlinear optical medium; and
an excitation light adjuster that adjusts polarization states of first excitation light and second excitation light that are input into the nonlinear optical medium, wherein
the excitation light adjuster adjusts the polarization states of the first excitation light and the second excitation light so that, when the first excitation light and the second excitation light are input to the polarizer, polarization directions of the first excitation light and the second excitation light are orthogonal to each other, and a difference in angle between the polarization direction of the first excitation light and the polarization direction of the second excitation light, with respect to the polarization main axis of the polarizer, is equal to or smaller than a threshold value.

2. The optical-signal processing apparatus according to claim 1, further comprising a power adjuster that adjusts powers of the optical signal, the first excitation light and the second excitation light to a predetermined value or more so that a gain of the optical amplification of the nonlinear optical medium is saturated.

3. The optical-signal processing apparatus according to claim 2, wherein the power adjuster adjusts the powers of the optical signal, the first excitation light, and the second excitation light so that a power of input light that is input to the nonlinear optical medium or a power of output light that is output from the nonlinear optical medium or a power of output light that is output from the polarizer is set at a previously set value.

4. The optical-signal processing apparatus according to claim 3, wherein the excitation light adjuster extracts the polarization states of the first excitation light and the second excitation light that are input to the polarizer, and adjusts the polarization directions of the first excitation light and the second excitation light so that the extracted polarization state becomes a previously set polarization state.

5. The optical-signal processing apparatus according to claim 1, wherein the optical signal is an optical signal with wavelength-division multiplexing.

6. The optical-signal processing apparatus according to claim 1, wherein the first excitation light and the second excitation light are optical pulses of a predetermined cyclic frequency.

7. The optical-signal processing apparatus according to claim 1, wherein the first excitation light and the second excitation light are optical pulses whose peaks are flat.

8. The optical-signal processing apparatus according to claim 1, wherein the first excitation light and the second excitation light are optical pulses of a cyclic frequency that is higher by a predetermined value or more than a modulation rate of the optical signal.

9. The optical-signal processing apparatus according to claim 8, wherein the first excitation light and the second excitation light are obtained by time-division multiplexing pulses of a pulse width that is narrower by a predetermined value or more than the pulse width of the optical signal.

10. The optical-signal processing apparatus according to claim 1, wherein the first excitation light and the second excitation light are optical pulses of a predetermined cyclic frequency, and the first excitation light and the second excitation light are, in the nonlinear optical medium, shifted in terms of time relative to the optical signal.

11. The optical-signal processing apparatus according to claim 1, wherein a saturable absorbing medium is provided before or after the nonlinear optical medium.

12. The optical-signal processing apparatus according to claim 1, wherein the nonlinear optical medium is an optical fiber where the optical signal, the first excitation light, and the second excitation light generate four-wave mixing.

13. The optical-signal processing apparatus according to claim 12, wherein wavelengths of the first excitation light and the second excitation light are set within a predetermined range based on an average zero-dispersion wavelength of the optical fiber.

14. The optical-signal processing apparatus according to claim 12, wherein a mode field of the optical fiber is smaller than a predetermined value.

15. The optical-signal processing apparatus according to claim 1, wherein the nonlinear optical medium is an optical fiber where chromatic dispersion is different between the optical signal and the first and second excitation lights.

16. The optical-signal processing apparatus according to claim 15, wherein a mode field of the optical fiber is smaller than a predetermined value.

17. The optical-signal processing apparatus according to claim 1, wherein an optical filter with a center transmission bandwidth that transmits wavelengths within a predetermined range based on the center wavelength of an optical signal that is output from the nonlinear optical medium or the polarizer is provided so that constituents around the center wavelength of the optical signal are transmitted selectively.

18. The optical-signal processing apparatus according to claim 5, wherein an optical filter with a center transmission bandwidth that transmits wavelengths within a predetermined range based on each optical wave included in the optical signal with wavelength-division multiplexing that is output from the nonlinear optical medium or from the polarizer is provided so that constituents around the center wavelength of the optical wave are transmitted selectively.

* * * * *